(12) United States Patent
Wu

(10) Patent No.: US 11,151,878 B2
(45) Date of Patent: Oct. 19, 2021

(54) INSTANT TRAFFIC CONDITION WARNING DEVICE AND METHOD

(71) Applicants: Inventec (Pudong) Technology Corporation, Shanghai (CN); INVENTEC CORPORATION, Taipei (TW)

(72) Inventor: Cheng-Yu Wu, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 234 days.

(21) Appl. No.: 16/435,851

(22) Filed: Jun. 10, 2019

(65) Prior Publication Data

US 2020/0380866 A1 Dec. 3, 2020

(30) Foreign Application Priority Data

May 27, 2019 (CN) .......................... 201910447115.8

(51) Int. Cl.
   *G08G 1/16* (2006.01)
   *G08G 1/01* (2006.01)
   *H04W 4/40* (2018.01)

(52) U.S. Cl.
   CPC ............. *G08G 1/164* (2013.01); *G08G 1/012* (2013.01); *G08G 1/0145* (2013.01); *G08G 1/166* (2013.01); *H04W 4/40* (2018.02)

(58) Field of Classification Search
   CPC ...... G08G 1/012; G08G 1/0145; G08G 1/164; G08G 1/166; H04W 4/40
   See application file for complete search history.

(56) References Cited

U.S. PATENT DOCUMENTS

| | | | |
|---|---|---|---|
| 2007/0050114 A1* | 3/2007 | Koike | B60W 40/04 701/45 |
| 2007/0255498 A1* | 11/2007 | McDaniel | G01S 13/931 701/301 |
| 2016/0144915 A1* | 5/2016 | Bejestan | G01C 21/3484 340/432 |
| 2016/0231746 A1* | 8/2016 | Hazelton | G01S 13/867 |
| 2019/0001938 A1* | 1/2019 | Takaki | B60T 8/171 |
| 2019/0101634 A1* | 4/2019 | Baheti | G01S 7/415 |
| 2019/0366926 A1* | 12/2019 | Hathaway | G08G 1/162 |

* cited by examiner

*Primary Examiner* — Sisay Yacob
(74) *Attorney, Agent, or Firm* — Locke Lord LLP; Tim Tingkang Xia, Esq.

(57) ABSTRACT

An instant traffic condition warning method comprises the following steps. A controller receives a vehicle distance value and a vehicle velocity value, and the controller determines whether the vehicle distance value is less than a distance threshold. When the vehicle distance value is less than the distance threshold, the controller determines whether the vehicle velocity value is larger than a velocity threshold. When the vehicle velocity value is larger than the velocity threshold, a warning element generates a warning signal.

8 Claims, 9 Drawing Sheets

INSTANT TRAFFIC CONDITION WARNING DEVICE AND METHOD

CROSS-REFERENCE TO RELATED APPLICATIONS

This non-provisional application claims priority under 35 U.S.C. § 119(a) on Patent Application No(s). 201910447115.8 filed in China on May 27, 2019, the entire contents of which are hereby incorporated by reference.

BACKGROUND

1. Technical Field

The disclosure relates to a warning method, more particularly to the warning method adapted to the instant traffic condition.

2. Related Art

Nowadays, the V2X NB-IOT communication protocol has been widely applied in the field of the internet of vehicle (IoV). Generally, the V2X NB-IOT communication protocol comprises the V2P (vehicle to pedestrian) communication protocol, the V2I (vehicle to infrastructure) communication protocol such as the communication between the vehicle and the traffic signs, and the V2N (vehicle to network) communication protocol such as the communication between the vehicle and the network formed by the LTE base stations. Moreover, there are a plurality of vehicles having the V2X NB-IOT communication assembly, so the vehicles are able to communicably connects to each other or to other on-road device by the V2X NB-IOT communication protocol. Hence, the instant traffic information is able to be sent between the vehicles and other on-road device, and the safety for driving may be improved since the driver may get the instant traffic information more frequently.

However, most of the device with the V2X NB-IOT communication assembly are just adapted to determine whether the device may occur a potential traffic accident, rather than determine whether other vehicles or on-road device adjacent to the device may occur the potential traffic accident. For these reasons, most of the traffic accidents still cannot be prevented efficiently.

SUMMARY

According to one or more embodiment of this disclosure, an instant traffic condition warning method comprises the following steps. A controller receives a vehicle distance value and a vehicle velocity value, and the controller determines whether the vehicle distance value is less than a distance threshold. When the vehicle distance value is less than the distance threshold, the controller determines whether the vehicle velocity value is larger than a velocity threshold. When the vehicle velocity value is larger than the velocity threshold, a warning element generates a warning signal.

According to one or more embodiment of this disclosure, an instant traffic condition warning device comprises a sensor, a warning element, a communication assembly and a controller. The sensor is adapted to obtain a vehicle distance value and a vehicle velocity value both associated with a vehicle. The warning element generates a warning signal when the warning element is triggered. Also, the communication assembly is adapted to receive and send the warning signal. Furthermore, the controller is electrically connected to the warning element, the communication assembly and the sensor, with the controller adapted to receive the vehicle distance value and the vehicle velocity value, the controller determines whether the vehicle distance value is less than a distance threshold, wherein the controller determines whether the vehicle velocity value is larger than a velocity threshold when the controller determines the vehicle distance value less than the distance threshold, and the controller triggers the warning element to generate the warning signal when the controller determines the vehicle velocity value larger than the velocity threshold.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
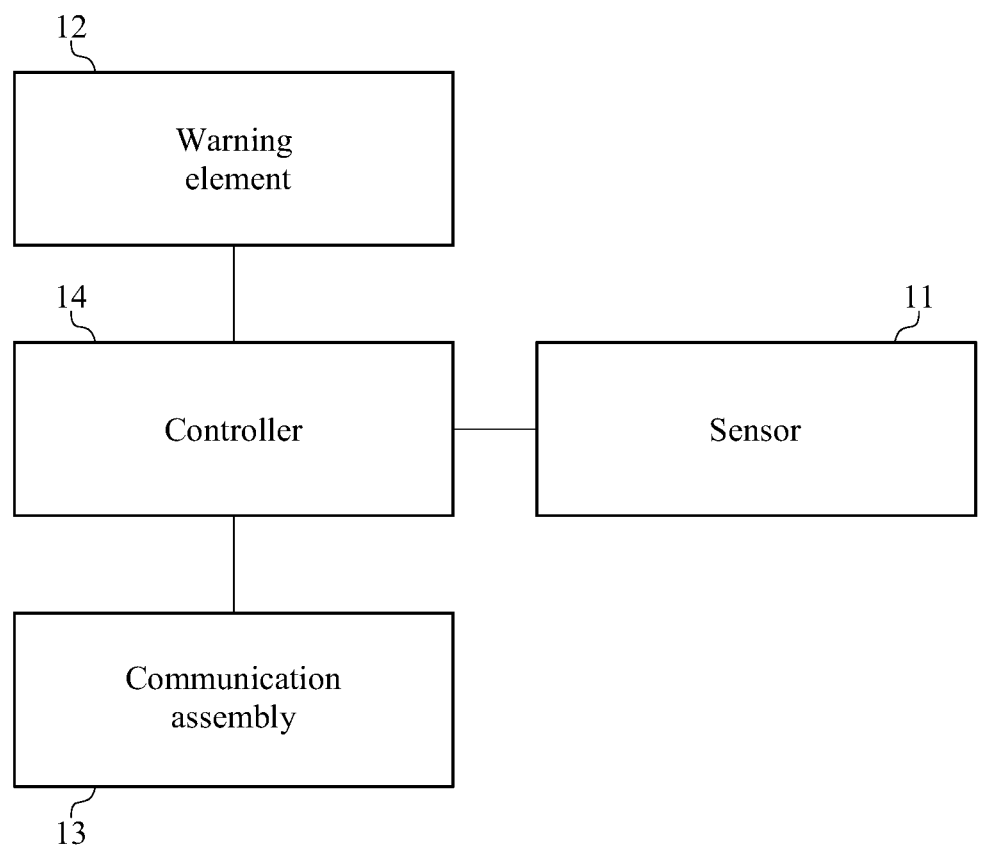
FIG. 1 is the block diagram of the instant traffic condition warning device in an embodiment of this disclosure.

Please refer to FIG. 1. FIG. 1 is the block diagram of the instant traffic condition warning device in an embodiment of this disclosure. The instant traffic condition warning device 1 comprises a sensor 11, a warning element 12, a communication assembly 13 and a controller 14, wherein the controller 14 is electrically connected to the warning element 12, the communication assembly 13 and the sensor 11.

The sensor 11 is adapted to obtain a vehicle distance value and a vehicle velocity value, wherein the vehicle distance value and the vehicle velocity value are associated with a vehicle. Particularly, the vehicle distance value may be a distance between the vehicle and the sensor 11, and the vehicle velocity value may be the relative velocity between the vehicle and the ground. Specifically, aforementioned relative velocity is calculated from the relative velocity between the vehicle and the sensor 11 and the velocity of the sensor 11 itself. For example, the sensor 11 may be ultrasonic radar (such as parking sensors of the vehicle), light detection and ranging (LIDAR) or an infrared sensor (IR sensor) etc., this disclosure is not limited thereto.

The warning element 12 is adapted to generate the warning signal when the warning element 12 is triggered. Particularly, when the instant traffic condition warning device 1 determines a potential traffic accident may occur, the warning element 12 is triggered and generates the warning signal. Hence, it can notice the vehicle, the driver of motorcycle, the driver of bike or the pedestrian with the instant traffic condition warning device 1 to watch out for the traffic condition. For example, the warning element 12 may be a microphone, a lamp or a screen, and the warning signal may be performed as the voice, the light or the image etc., and this disclosure is not limited thereto.

The communication assembly 13 is adapted to receive or send the warning signal. Particularly, the communication assembly 13 is able to send the warning signal to the vehicle, the driver of motorcycle, the driver of bike or the pedestrian may occur the traffic accident via different communication protocols. For example, the communication assembly 13 may be a V2X communication assembly in order to receive the warning signal from another vehicle through the V2X communication protocol. On the other hand, the communication assembly 13 may also be Bluetooth, and the driver of motorcycle, the driver of bike and the pedestrian are able to receive the warning signal via a portable device or a smart wearable device.

The controller 14 is adapted to receive the vehicle distance value and the vehicle velocity value, and the controller 14 determine whether the vehicle distance value less than the distance threshold. When the controller 14 determines that the vehicle distance value is less than the distance threshold, the controller 14 determines whether the vehicle velocity value larger than the velocity threshold. Also, when the controller 14 determines the vehicle velocity value larger than the velocity threshold, the controller 14 triggers the warning element 12 to generate the warning signal. For example, the controller 14 may be a microcontroller unit (MCU), a micro processing unit (MPU), and this disclosure is not limited thereto. Moreover, the detailed description of the controller 14 is described hereinafter.

Figure 2:
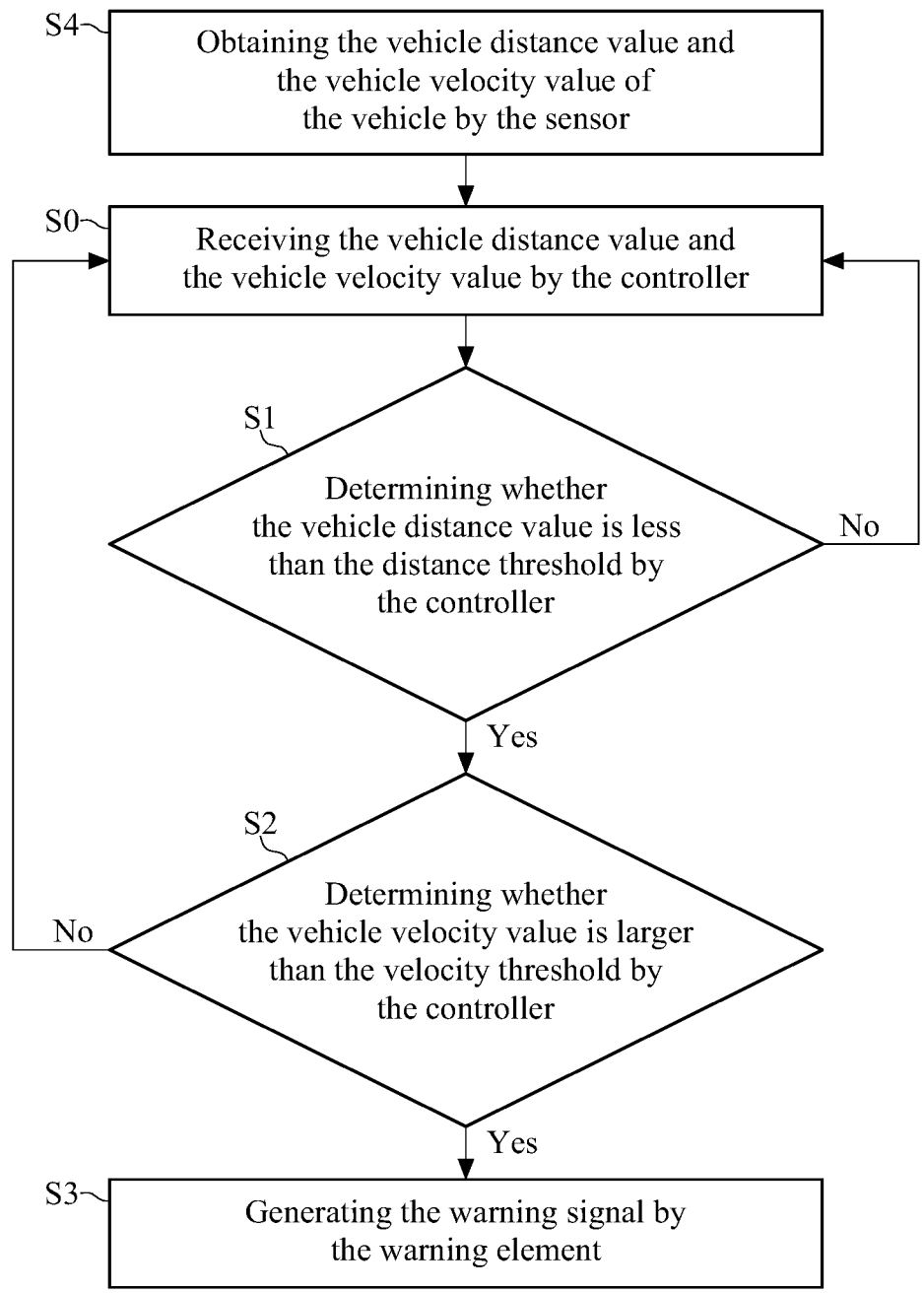
FIG. 2 is the flowchart of the instant traffic condition warning method in an embodiment of this disclosure.

Please refer to FIG. 2. FIG. 2 is the flowchart of the instant traffic condition warning method in an embodiment of this disclosure. Please refer to step S0: receiving the vehicle distance value and the vehicle velocity value by the controller 14. Based on different situations, the controller 14 receives the vehicle distance value and the vehicle velocity value from the sensor 11 or the communication assembly 13. Particularly, when the controller 14 is disposed at a wearable device, the vehicle distance value and the vehicle velocity value may be obtained by the sensor 11, and the sensor 11 sends the vehicle distance value and the vehicle velocity value to the controller 14 (step S4). On the other hand, when the controller 14 is disposed at a vehicle, the vehicle distance value and the vehicle velocity value may be obtained by the communication assembly 13 of the vehicle from other vehicles; alternatively, the vehicle distance value and the vehicle velocity value both of the portable device P may be obtained by the sensor 11. It needs to notice that, all of aforementioned situations are able to go to the step S0. The step S4 in FIG. 2 is an example for describing the embodiment more clearly rather than limits the precondition for performing the steps S0 to S3. Please refer to step S1: determining whether the vehicle distance value is less than the distance threshold by the controller 14, and the threshold may be a value set by the user.

When the controller 14 determines the vehicle distance value not less than the distance threshold, the program goes to the step S0. On the other hand, when the vehicle distance value is less than the distance threshold, please refer to step S2: determining whether the vehicle velocity value is larger than the velocity threshold by the controller 14, wherein the velocity threshold may be a constant or a values changing with the distance threshold. For example, larger distance threshold may be corresponding to less the velocity threshold, thereby the controller 14 can determine the probability of occurring traffic accident. When the vehicle velocity value is larger than the velocity threshold, please refer to step S3: generating the warning signal by the warning element 12, wherein the warning signal is also able to be sent to the vehicle generating the vehicle distance value and the vehicle velocity value. Therefore, after the vehicle receives the warning signal, the vehicle is able to be broken manually by the driver; alternatively, the vehicle is also able to be broken automatically by triggering the automatic braking system, such as the automatic brake differential (ABD), the anti-lock braking system (ABS) or etc. to work. On the other hand, when the vehicle velocity value is not larger than the velocity threshold, the program goes to the step S0.

Figure 3A:
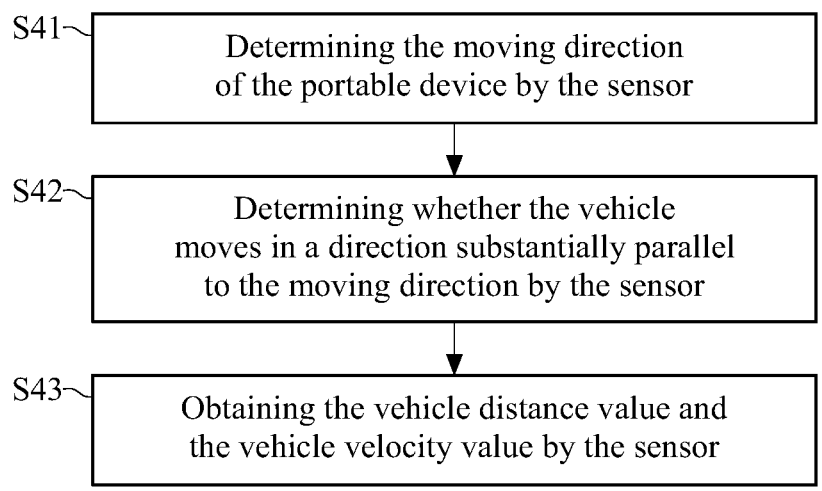
FIG. 3A is the flowchart of the instant traffic condition warning method in another embodiment of this disclosure.
Figure 3B:
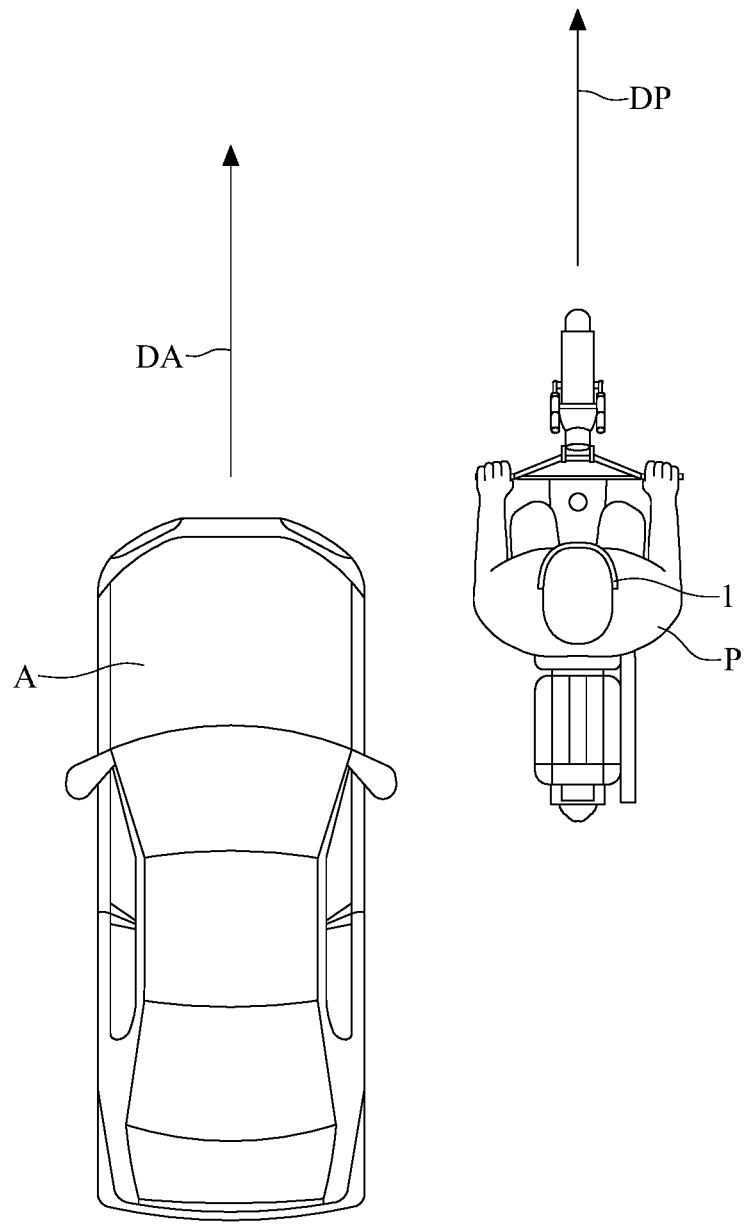
FIG. 3B is the schematic diagram of the warning method shown in FIG. 3A.

Please refer to FIGS. 3A and 3B. FIG. 3A is the flowchart of the instant traffic condition warning method in another embodiment of this disclosure. FIG. 3B is the schematic diagram of the warning method shown in FIG. 3A. FIG. 3B shows the portable device P (shown as a motorcycle) with the instant traffic condition warning device 1 and a vehicle A. Specifically, the portable device P cannot detect the rear vehicle A coming in the moving direction DA when the portable device P is moving in the moving direction DP. Please refer to the step S4 in FIG. 2: obtaining the vehicle distance value and the vehicle velocity value of the vehicle by the sensor 11, wherein the detail flowchart of the step S4 is shown in FIG. 3A. Please refer to the step S41: determining the moving direction DP of the portable device P by the sensor 11, wherein the sensor 11 is disposed in the instant traffic condition warning device 1 of the portable device P.

Please refer to the step S42: determining whether the vehicle A moves in a direction substantially parallel to the moving direction DP by the sensor 11. Particularly, aforementioned "the direction substantially parallel to the moving direction DP" comprises the direction parallel to the moving direction DP, such as the moving direction DA of the vehicle A. On the other hand, "the direction substantially parallel to the moving direction DP" may also be the direction which has an angle between the moving direction DP, wherein the angle is less than a threshold. For example, the threshold may be set manually, and the value of the threshold may be between 5 degrees to 10 degrees. When the sensor 11 determines the vehicle A as moving in the direction substantially parallel to the moving direction DP, please refer to the step S43: obtaining the vehicle distance value and the vehicle velocity value by the sensor 11, wherein the vehicle distance value and the vehicle velocity value are associated with the vehicle A. Specifically, the instant traffic condition warning device 1 determines whether the potential traffic accident may occurred between the portable device P and the vehicle A based on the vehicle distance value and the vehicle velocity value. When the instant traffic condition warning device 1 determines the potential traffic accident may probability occur, the instant traffic condition warning device 1 is able to send the warning signal to the vehicle A in order to warn the vehicle A to avoid aforementioned potential traffic accident. Alternatively, the instant traffic condition warning device 1 is able to trigger the vehicle A to be broken automatically.

Figure 4A:
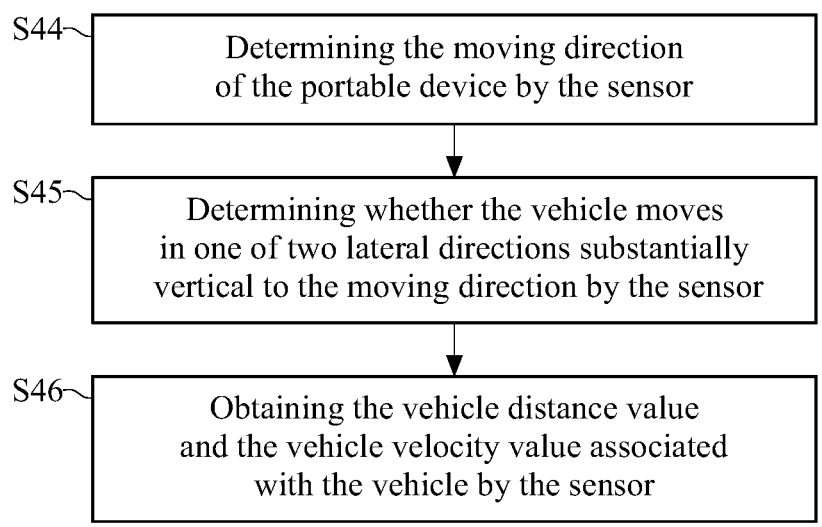
FIG. 4A is the flowchart of the instant traffic condition warning method in another embodiment of this disclosure.
Figure 4B:
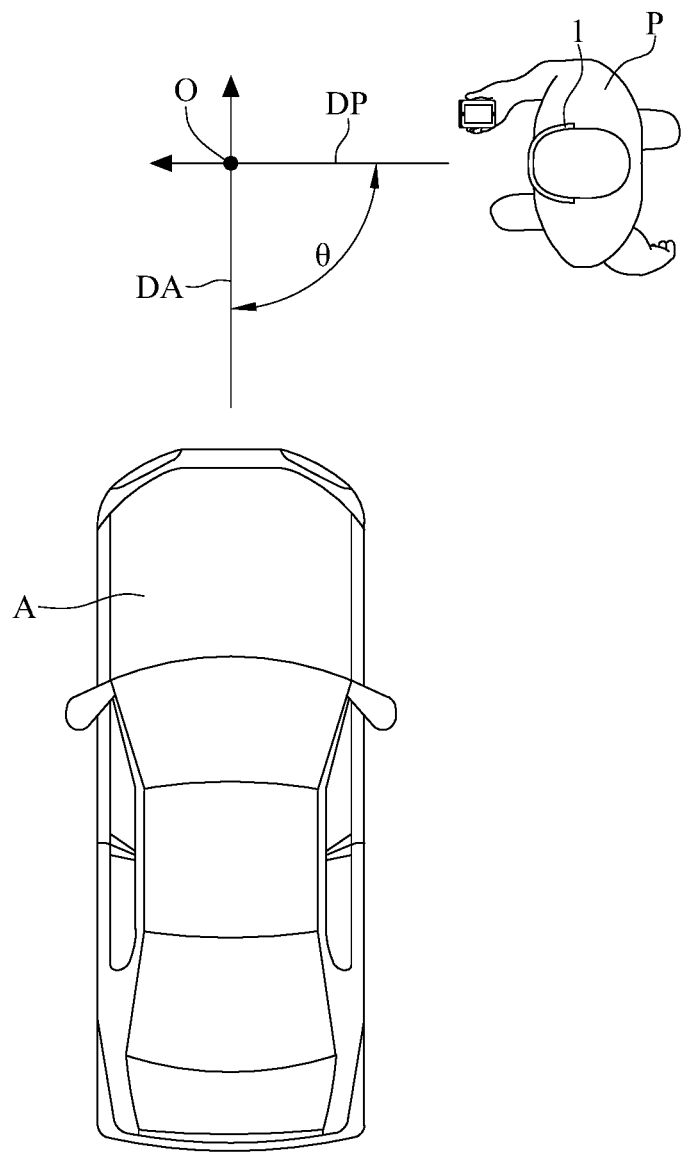
FIG. 4B is the schematic diagram of the warning method shown in FIG. 4A.

Please refer to FIGS. 4A and 4B. FIG. 4A is the flowchart of the instant traffic condition warning method in another embodiment of this disclosure. FIG. 4B is the schematic diagram of the warning method shown in FIG. 4A. FIG. 4B shows the vehicle A and the portable device P (shown as located at a pedestrian) having the instant traffic condition warning device 1. Specifically, the pedestrian is using a mobile phone while walking in the moving direction DP as well as the portable device P moving in the moving direction DP, so the pedestrian cannot notice the vehicle A coming in the moving direction DA from one of two lateral directions of the moving direction DP directly. As a result, the pedestrian with the portable device P and the vehicle A may collide at the cross point O.

The step S44 is the same as the step S41 shown in FIG. 3A, so the descriptions are omitted herein. Please refer to the step S45: determining whether the vehicle A moves in one of two lateral directions substantially vertical to the moving direction DP by the sensor 11. Particularly, aforementioned "one of two lateral directions substantially vertical to the moving direction DP" may comprise the directions vertical to the moving direction DP, and the sensor 11 is able to detect whether the vehicle A moves in the directions vertical to the moving direction DP firstly. On the other hand, "substantially vertical" may indicate the direction not vertical to the moving direction DP perfectly but having an angle θ in a predetermined angular range. For example, the sensor 11 is able to detect whether the vehicle A moves in the directions having the angle θ in the range from 70 degrees to 110 degrees between the moving direction DP. Specifically, the predetermined angular range of the instant traffic condition warning device 1 may be set manually. Furthermore, when the sensor 11 determines the vehicle A as moving in one of two lateral directions substantially vertical to the moving direction DP, please refer to the step S46: obtaining the vehicle distance value and the vehicle velocity value associated with the vehicle A by the sensor 11. Since the detail of the step S46 is the same as the step S43 in FIG. 3A, the descriptions are omitted herein.

It is worth to mention that, when the communication assembly 13 of the instant traffic condition warning device 1 is the V2X communication assembly, the instant traffic condition warning device 1 is able to determine the traffic signs through the V2I communication protocol. For example, the instant traffic condition warning device 1 is able to further start the sensor 11 to operation once the V2X communication assembly detects the traffic light changed from red light to green light. Also, the instant traffic condition warning device 1 is able to generate the warning signal once the pedestrian whom is with the instant traffic condition warning device 1 runs the red light.

Figure 5A:
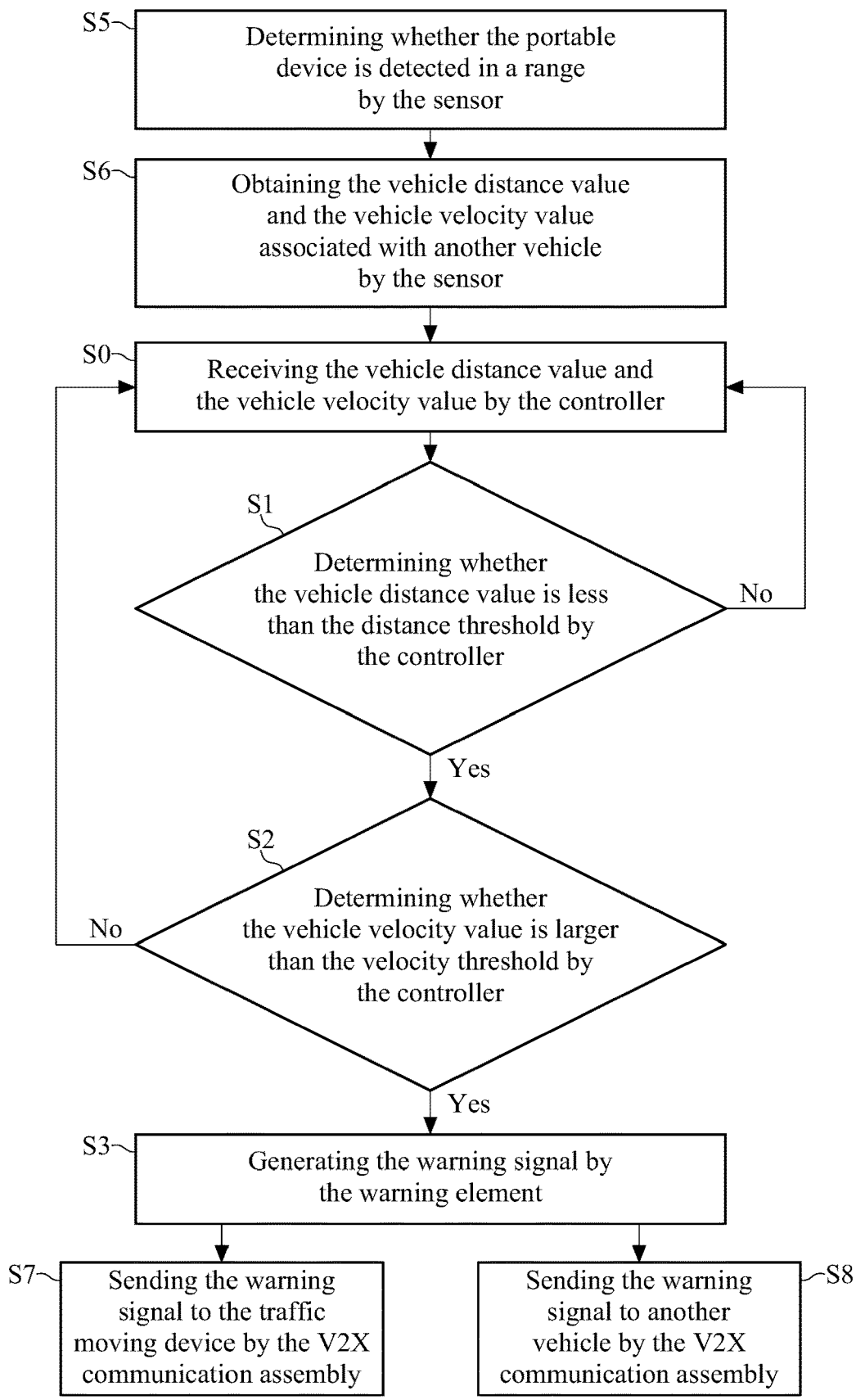
FIG. 5A is the flowchart of the instant traffic condition warning method in another embodiment of this disclosure.
Figure 5B:
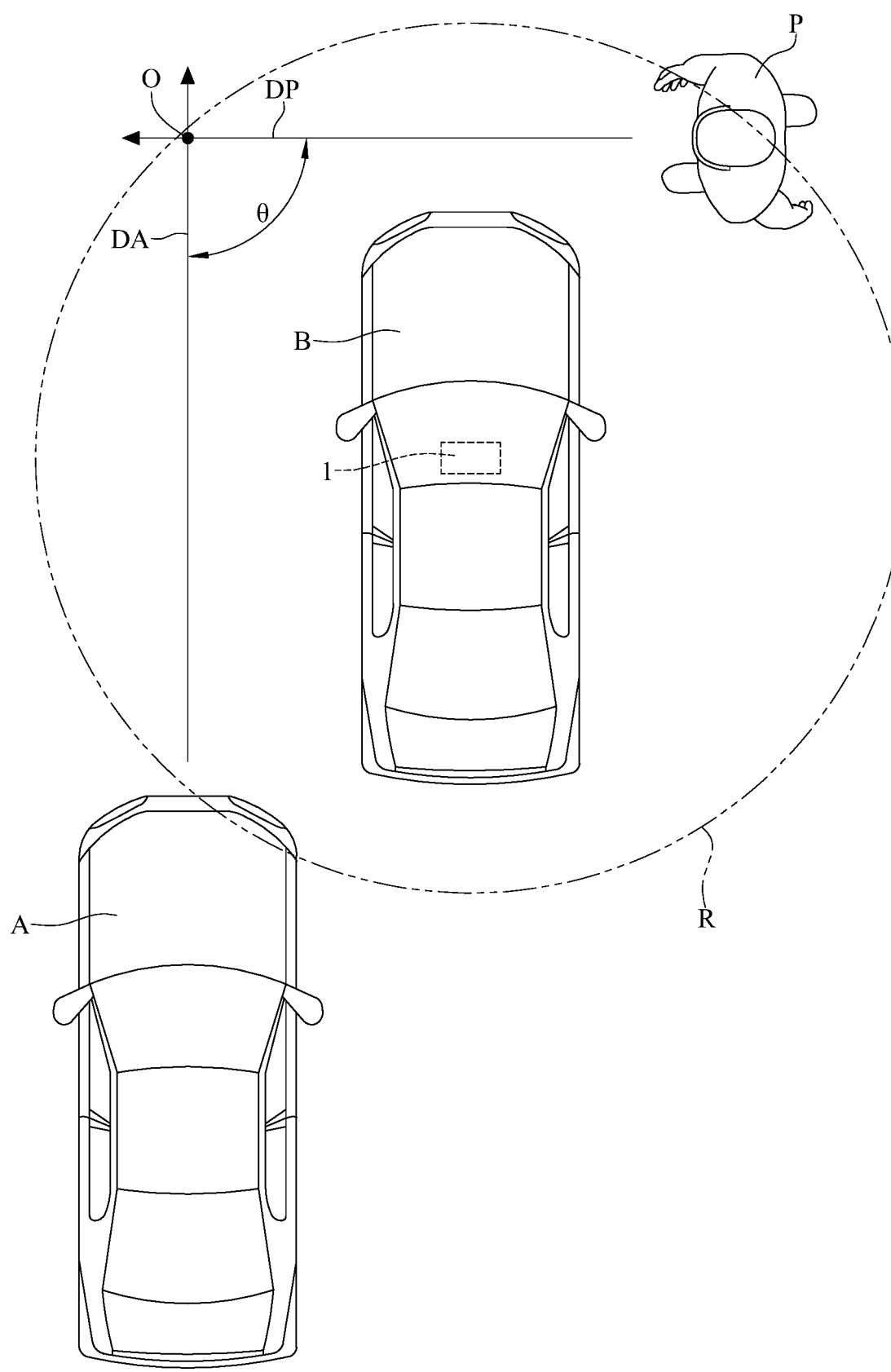
FIG. 5B is the schematic diagram of the warning method shown in FIG. 5A.

Please refer to FIGS. 5A and 5B. FIG. 5A is the flowchart of the instant traffic condition warning method in another embodiment of this disclosure. FIG. 5B is the schematic diagram of the warning method shown in FIG. 5A. FIG. 5B shows another vehicle A and the vehicle B having the instant traffic condition warning device 1. Specifically, since the vehicle B blocks said another vehicle A from the portable device P (shown as located at the pedestrian), the pedestrian walking in the moving direction DP as well as the portable device P moving in the moving direction DP cannot notice another vehicle A coming in the moving direction DA. Hence, the portable device P and the vehicle B may collide at the cross point O.

Please refer to the step S5: determining whether the portable device P is detected in a range R by the sensor 11; wherein the sensor 11 is disposed at the vehicle B, and the range R may be a value set manually. For example, the range R may be an area of a specific radius and centered on the vehicle B. Furthermore, when the sensor 11 detects the portable device P in the range R, please refer to the step S6: obtaining the vehicle distance value and the vehicle velocity value associated with another vehicle A by the sensor 11, and sending the vehicle distance value and the vehicle velocity value to the controller 14 by the sensor 11. Particularly, the sensor 11 is disposed at the vehicle B. After the controller 14 receives the vehicle distance value and the vehicle velocity value, and the controller 14 performs the steps S0 to S3, please refer to the step S7: sending the warning signal to the traffic moving P device by the V2X communication assembly. Herein, the V2X communication assembly is one type of variety kinds of the communication assembly 13, wherein the V2X communication assembly sends the warning signal to the portable device P by the V2P communication protocol. In addition, the portable device P may be the electronic device ability to be disposed the V2X communication assembly for receiving the warning signal, such as the mobile phone or the smart wearable device. On the other hand, please refer to the step S8: sending the warning signal to another vehicle A by the V2X communication assembly 13. Hence, another vehicle A is able to be broken manually or automatically once receives the warning signal, and the potential traffic accident may probability to be avoided.

It is worth to mention that, the controller 14 is able to compare the velocity between the portable device P and another vehicle A, and send the warning signal to the one having slower velocity. The condition shown in FIG. 5B is for describing this embodiment more clearly rather than limiting this embodiment, so the portable device P is also able to be a motorcycle or a vehicle, etc., and this embodiment is not limited thereto.

Hereinafter, aforementioned distance threshold is defined as a first distance threshold, aforementioned velocity threshold is defined as a first velocity threshold, and aforementioned warning signal is defined as a first warning signal. In the following contents, a second distance threshold, a second velocity threshold and a second warning are further involved.

Figure 6:
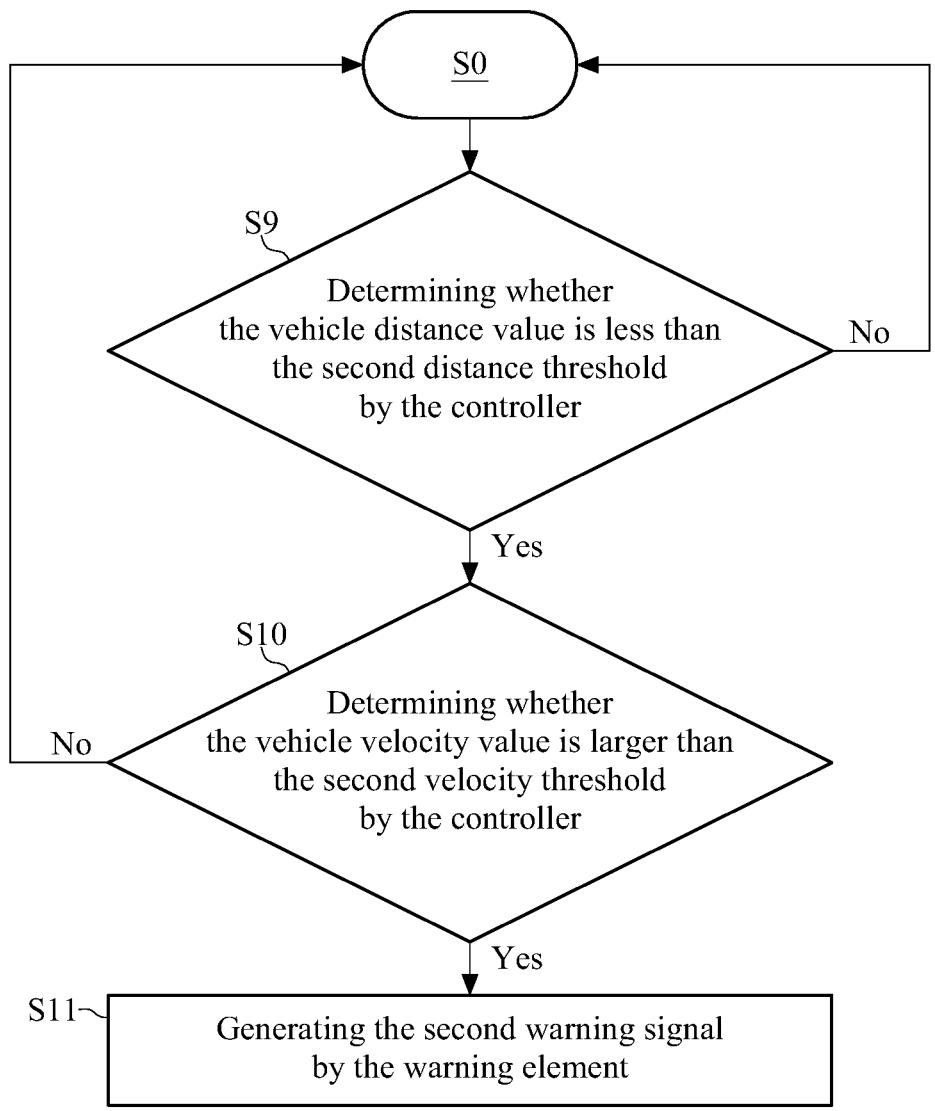
FIG. 6 is the flowchart of the instant traffic condition warning method in another embodiment of this disclosure.

Please refer to FIG. 6. FIG. 6 is the flowchart of the instant traffic condition warning method in another embodiment of this disclosure. After the step S0 in FIG. 2 is performed, and when the vehicle distance value is less than the first distance threshold, please refer to the step S9: determining whether the vehicle distance value is less than the second distance threshold by the controller 14, wherein the second distance threshold is larger than the first distance threshold. When the vehicle distance value is less than the second distance threshold, please refer to the step S10: determining whether the vehicle velocity value is larger than the second velocity threshold by the controller 14, wherein the second velocity threshold is larger than the first velocity threshold. Briefly, the steps S9 and S10 indicate that the controller 14 determines whether a vehicle having faster velocity and farer distance than aforementioned vehicle A. When the vehicle velocity value is larger than the second velocity threshold, please refer to the step S11: generating the second warning signal by the warning element 12, wherein the second warning signal is performed differently from the first warning signal, such as the voice with different volume or frequency.

As a result, the instant traffic condition warning device and method disclosed in this disclosure are able to detect the potential traffic accident for the vehicle, the motorcycle or the pedestrian based on the blind spot during moving on the road. Also, the device and the method are able to generate the warning signal immediately for warn the vehicle, the motorcycle or the pedestrian to notice the traffic condition. Furthermore, the device and the method are able to generate variety of warning signal based on different distance between the sensor of the device and the moving vehicle, and the velocity of the moving vehicle. Hence, the driver and pedestrian are able to recognized the instant traffic condition more intuitively, and reacts to prevent themselves from the potential traffic accident more immediately.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An instant traffic condition warning method, comprising:
   receiving a vehicle distance value and a vehicle velocity value by a controller, and determining whether the vehicle distance value is less than a distance threshold by the controller;
   determining whether the vehicle velocity value is larger than a velocity threshold by the controller when the vehicle distance value is less than the distance threshold; and
   generating a warning signal by a warning element when the vehicle velocity value is larger than the velocity threshold,
   wherein the distance threshold is defined as a first distance threshold, the velocity threshold is defined as a first velocity threshold, and the warning signal is defined as a first warning signal, and after receiving the vehicle distance value and the vehicle velocity value by the controller, the method further comprises:
      determining whether the vehicle distance value is less than a second distance threshold by the controller when the vehicle distance value is not less than the first distance threshold;
      determining whether the vehicle velocity value is larger than a second velocity threshold by the controller when the vehicle distance value is less than the second distance threshold; and
      generating a second warning signal by the warning element when the vehicle velocity value is larger than the second velocity threshold;
   wherein the second distance threshold is larger than the first distance threshold, and the second velocity threshold is larger than the first velocity threshold.

2. The instant traffic condition warning method according to claim 1, wherein, with the vehicle distance value and the vehicle velocity value associated with a vehicle, before receiving the vehicle distance value and the vehicle velocity value by the controller, the method further comprises:
   obtaining the vehicle distance value and the vehicle velocity value by a sensor, and sending the vehicle distance value and the vehicle velocity value to the controller by the sensor.

3. The instant traffic condition warning method according to claim 2, wherein the sensor is disposed at a portable device, and, with the vehicle distance value and the vehicle velocity value associated with the vehicle, obtaining the vehicle distance value and the vehicle velocity value by the sensor comprises:
   determining a moving direction of the portable device by the sensor;
   determining whether the vehicle moves in a direction substantially parallel to the moving direction by the sensor; and
   obtaining the vehicle distance value and the vehicle velocity value by the sensor when the sensor determines the vehicle as moving in the direction.

4. The instant traffic condition warning method according to claim 2, wherein the sensor is disposed in a portable device, and, with the vehicle distance value and the vehicle velocity value associated with the vehicle, obtaining the vehicle distance value and the vehicle velocity value by the sensor comprises:
   determining a moving direction of the portable device by the sensor;
   determining whether the vehicle moves in one of two lateral directions substantially vertical to the moving direction by the sensor; and
   obtaining the vehicle distance value and the vehicle velocity value by the sensor when the sensor determines the vehicle as moving in one of the two lateral directions.

5. The instant traffic condition warning method according to claim 1, wherein a sensor and a Vehicle-to-Everything (V2X) communication assembly are disposed at a vehicle, with the vehicle distance value and the vehicle velocity value associated with another vehicle, before receiving the vehicle distance value and the vehicle velocity value by the controller, the method further comprises:
   determining whether a portable device is detected in a range by the sensor; and
   obtaining the vehicle distance value and the vehicle velocity value by the sensor, and sending the vehicle distance value and the vehicle velocity value to the controller by the sensor when the sensor detects the portable device is in the range;
   wherein after generating the warning signal by the warning element, the method further comprises:
      sending the warning signal to the portable device by the V2X communication assembly.

6. The instant traffic condition warning method according to claim 1, wherein a Vehicle-to-Everything (V2X) communication assembly is disposed at another vehicle, after generating the warning signal by the warning element when the vehicle velocity value is larger than the velocity threshold, the method further comprises:
   sending the warning signal to the another vehicle by the V2X communication assembly.

7. An instant traffic condition warning device, comprising:
   a sensor adapted to obtain a vehicle distance value and a vehicle velocity value both associated with a vehicle;
   a warning element generates a warning signal when the warning element is triggered;
   a communication assembly adapted to receive and send the warning signal; and
   a controller electrically connected to the warning element, the communication assembly and the sensor, with the controller adapted to receive the vehicle distance value and the vehicle velocity value, the controller determining whether the vehicle distance value is less than a distance threshold, wherein the controller determines whether the vehicle velocity value is larger than a velocity threshold when the controller determines the vehicle distance value less than the distance threshold, and the controller triggers the warning element to generate the warning signal when the controller determines the vehicle velocity value larger than the velocity threshold, wherein the distance threshold is defined as a first distance threshold, the velocity threshold is defined as a first velocity threshold, and the warning signal is defined as a first warning signal, and after receiving the vehicle distance value and the vehicle velocity value, the controller determines whether the vehicle distance value is less than a second distance threshold when the vehicle distance value is not less than the first distance threshold, and determines whether the vehicle velocity value is larger than a second velocity threshold when the vehicle distance value is less than the second distance threshold, the controller triggers the warning element to generate a second warning signal by the warning element when the vehicle velocity value is larger than the second velocity threshold, wherein the second distance threshold is larger than the first distance threshold, and the second velocity threshold is larger than the first velocity threshold.

8. The instant traffic condition warning device according to claim 7, wherein the communication assembly is a Vehicle-to-Everything (V2X) communication assembly, with the V2X communication assembly adapted to obtain the vehicle distance value and the vehicle velocity value both associated with the vehicle, the V2X communication assembly sends the vehicle distance value and the vehicle velocity value to the controller.

\* \* \* \* \*